(12) United States Patent
Fu

(10) Patent No.: US 6,458,058 B1
(45) Date of Patent: Oct. 1, 2002

(54) SPEED REDUCER IN A PORTABLE ELECTRIC TOOL

(76) Inventor: Chun-Fa Fu, Fl., 8-18, No. 208, Chung-Kang St., Taichung City (TW)

( * ) Notice: Subject to any disclaimer, the term of this patent is extended or adjusted under 35 U.S.C. 154(b) by 11 days.

(21) Appl. No.: 09/794,282

(22) Filed: Feb. 28, 2001

(51) Int. Cl.$^7$ .............................................. F16H 57/08

(52) U.S. Cl. .......................... 475/331; 475/335; 74/415

(58) Field of Search .................... 475/331, 335, 475/344, 204; 74/415

(56) References Cited

U.S. PATENT DOCUMENTS

| | | | | |
|---|---|---|---|---|
| 1,970,251 A | * | 8/1934 | Rossman | 475/335 |
| 3,587,348 A | * | 6/1971 | Enoiu | 475/331 X |
| 3,661,028 A | * | 5/1972 | Fuchs | 74/415 |
| 4,699,023 A | * | 10/1987 | Bajulaz | 74/415 X |
| 5,098,358 A | * | 3/1992 | Igaku | 475/335 |

FOREIGN PATENT DOCUMENTS

BE 149799 * 1/1937 .................. 74/415

* cited by examiner

*Primary Examiner*—Charles A Marmor
*Assistant Examiner*—Ha Ho
(74) *Attorney, Agent, or Firm*—Charles E. Baxley

(57) ABSTRACT

A speed reducer in a portable electric tool is specifically referred to a powered tool for automotive repair with lighter weight and 12V direct current motor. The speed reducer comprises a casing to be attached by the 12V direct current motor, an end planetary gear set driven by the motor, and an output shaft rotary attached to the casing and driven by the planetary gear set. The speed reducer is characterized in that the output shaft at an end thereof provides an internal gear disk with internal circular teeth to mesh with two oppositely parallel positioned over pins provided on each gear of end planetary gear set. Hence, the output shaft can be driven to rotate by the planetary gear set instead of gears of the planetary gear set directly meshing with the output shaft. In this way, the disadvantage of loosening apart easily resided in the prior art can be corrected and the torque of output shaft can be increased greatly for saving the effort of user.

5 Claims, 5 Drawing Sheets

SPEED REDUCER IN A PORTABLE ELECTRIC TOOL

BACKGROUND OF THE INVENTION

1. Field of the Invention

The present invention relates to a speed reducer in a portable electric tool, and particularly to a speed reducer in a portable electric tool for automotive repair, which can increase the torque and prolong the life span in use.

2. Description of Related Art

Referring to FIG. 1, a latest developed portable electric tool is illustrated. The portable electric tool comprises a primary handle 10 and a gearbox on the primary handle. The gearbox is composed of a front casing 21 and a rear casing 22 and a first spacing block 23 and a second spacing black 24 are disposed between the front casing 21 and the rear casing 22.

A motor 30 is fixedly attached to the rear casing 22 and the motor preferably is 12V direct current type for being carried about with the car. A spindle 31 of motor 30 can be inserted between the rear casing 22 and the first spacing block 23. The free end of the spindle 31 provides a motor gear 32 and a first planetary gear set 40 is rotationally provided between the rear casing 22 and the first spacing block 23. The first planetary gear set 40 provides planetary gears 41, 42, 43 surrounding and meshing with the motor gear 32. The respective planetary gears 41, 42, 43 has teeth more than that on the motor gear 32 so as to constitute a first stage of speed reduction. A respective secondary planetary gear 410, 420, 430 is fixed to a respective shaft same as the planetary gears 41, 42, 43 to mesh with a transmission gear 44 for second stage of speed reduction. The transmission gear 44 provides a middle shaft 45 extends through the first spacing block 23 and a driven gear 46 is attached to the middle shaft between the first and the second spacing blocks 23, 24.

A second planetary gear set 50 is arranged between the first and the second spacing blocks 23, 24 and has planetary gears 51, 52, 53 thereon to surround and mesh with the driven gear 46. The planetary gears 51, 52, 53 each provide a pitch diameter and teeth smaller than the driven gear 46 so as to constitute a third stage of speed reduction. Each planetary gear 41, 42, 43 provides a shaft and the respective shaft further has a corresponding secondary gear 510, 520, 530 with a pitch diameter and teeth smaller than the planetary gear 51, 52, 53. A transmission gear 54 is surrounded by and meshing with the secondary gears 510, 520, 530 to constitute a fourth stage of speed reduction. An axial shaft 55 provided on the transmission gear 54 passes through the second spacing block 24 such that a driven gear 56 is arranged on the axial shaft between the second spacing block 24 and the front casing 21.

A third planetary gear set 60 is arranged between the second spacing block 24 and the front casing 21 and has planetary gears 61, 62, 63 surrounding and meshing with the driven gear 56. The teeth and the pitch diameter of respective planetary gear 61, 62, 63 are greater than the driven gear 56 to constitute a fifth stage of speed reduction. Each planetary gear 61, 62, 63 provides a shaft and the respective shaft further has a corresponding secondary gear 610, 620, 630 with teeth smaller than the planetary gear 61, 62, 63. An output gear 71 is surrounded and meshes with the secondary gears 610, 620, 630 to constitute a sixth stage of speed reduction. The output gear 71 has an output shaft 72 extends outward the front casing 21 so that an outer end of the output shaft 72 with an engaging head 73 can fit with sleeve for fastening or loosening bolts or nuts.

The torque provided by the prior art is somewhat insufficient from the point of view with regard to the entire structure of speed reducer thereof. Nevertheless, the most serious disadvantage of the prior art is that the third planetary gear set is easily damaged, and it is the reason that planetary gears 61, 62, 63 are apt to warp outward and become deformed during subjecting the resistant force of output gear 71. Hence, it may occur a problem of planetary gears 61, 62, 63 being in a state of loosening or occur a phenomenon of the output gear 71 or planetary gears 61, 62, 63 becoming slippery during meshing to each other and resulting in a situation of gear fracture. Hence, these defects resided in the prior art have to be overcome from the design of structure.

SUMMARY OF THE INVENTION

Accordingly, an object of the present invention is to provide a speed reducer in a portable electric tool, with which an output internal gear with internal circular teeth are arranged to mesh with over pins instead of planetary gears directly. Thus, the output torque can be enhanced and the phenomenon of gear damage or gear loosening can be avoided substantially.

BRIEF DESCRIPTION OF THE DRAWINGS

The detail structure, the applied principle, the function and the effectiveness of the present invention can be more fully understood by referring to the following description and accompanying drawings, in which.

DETAILED DESCRIPTION OF THE PREFERRED EMBODIMENT

Figure 2:
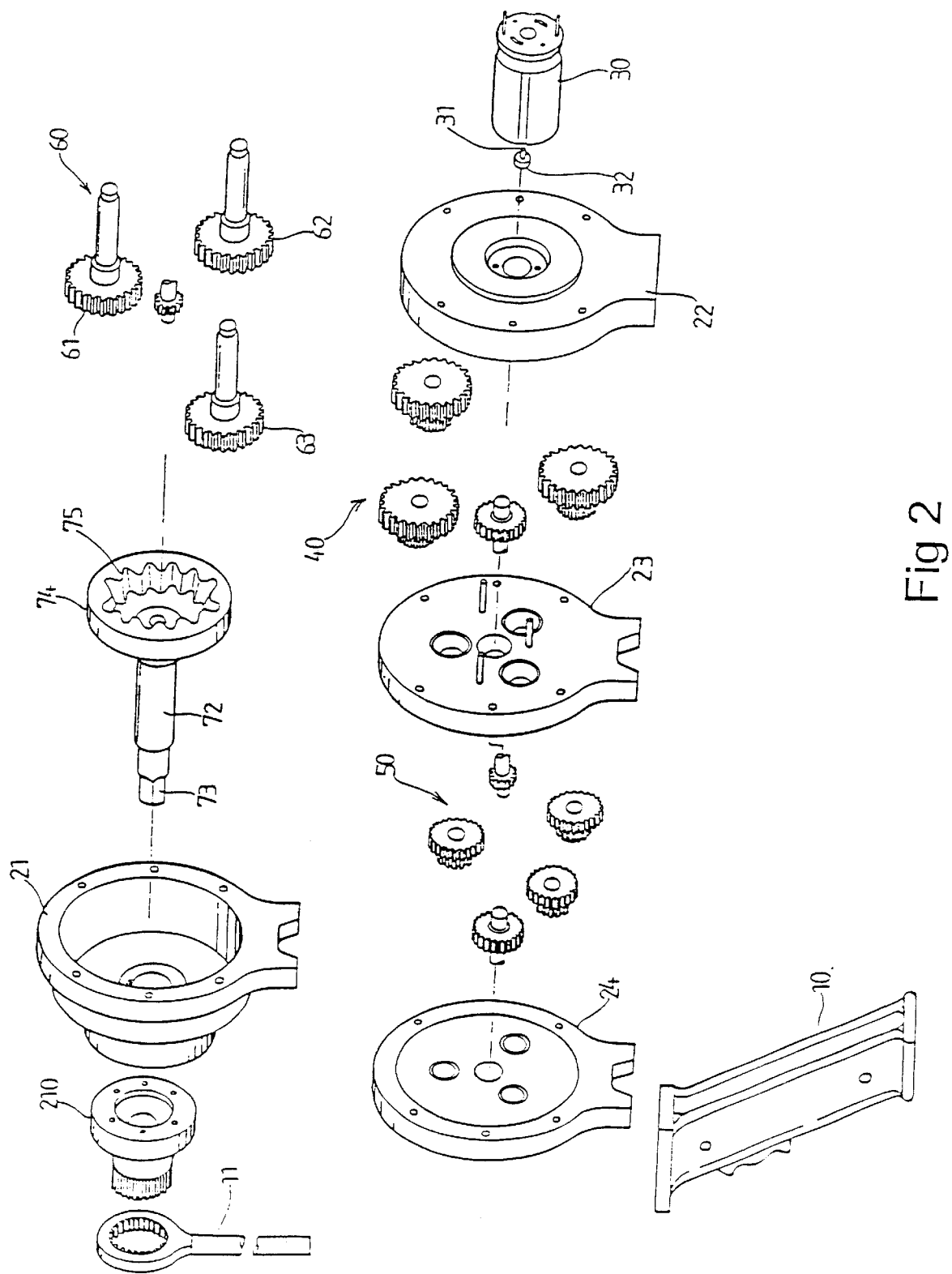
FIG. 2 is a disassembled perspective view of a portable electric tool containing the speed reducer of present invention.
Figure 3:
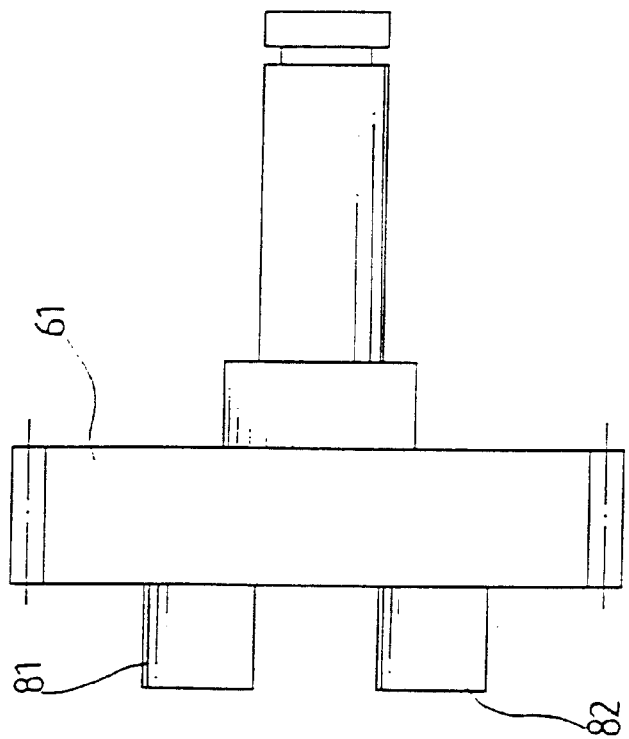
FIG. 3 is a plan view of over pins with gear provided in the speed reducer of the present invention.
Figure 4:
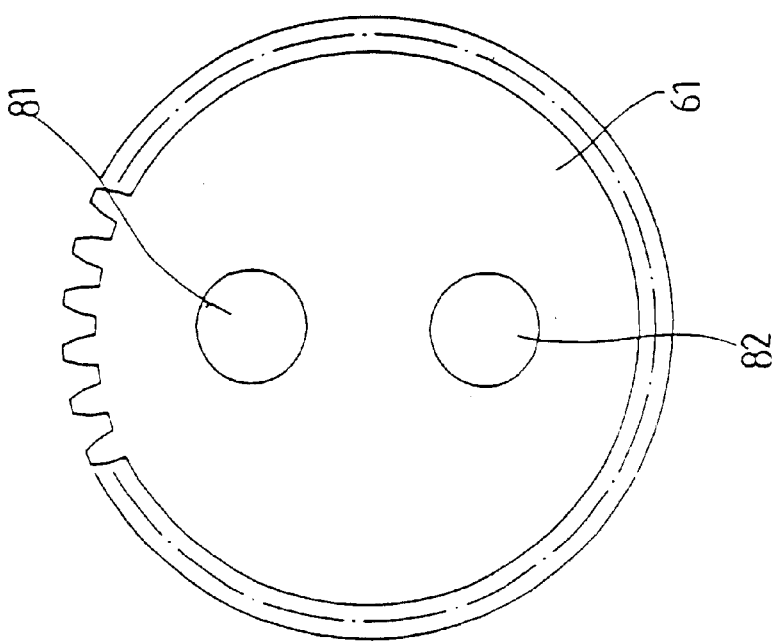
FIG. 4 is a side view of over pins shown in FIG. 3.

Referring to FIGS. 2, 3, and 4, a speed reducer in a portable electric tool according to the present invention provides a way improving the engagement of the output shaft 72 and the end planetary gear set 60.

The output shaft 72 at an end thereof provides an internal gear disk 74 with internal circular teeth 75.

Figure 5:
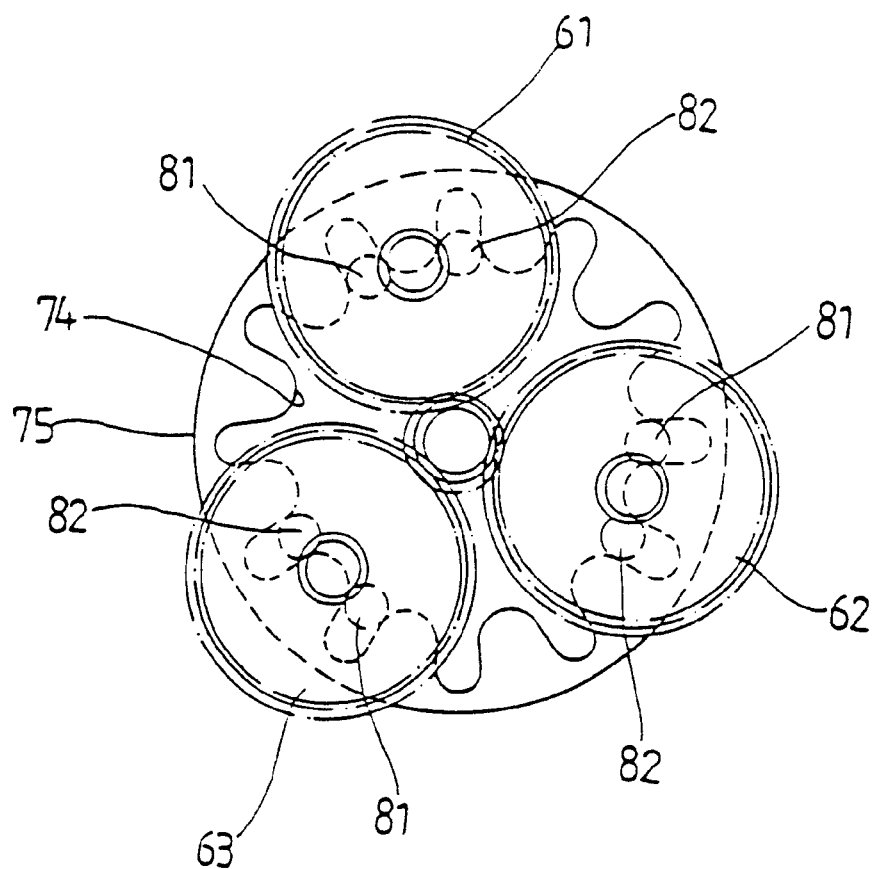
FIG. 5 is a plan view illustrating an internal gear with circular teeth meshing with over pins shown in FIG. 3.

The planetary gear set 60 provides gears 61, 62, 63 and each one of planetary gears 61, 62, 63 further provides two oppositely parallel positioned over pins 81, 82 extending outward from a lateral end face thereof with respect to the axial center thereof. Hence, the over pins 81, 82 on each planetary gear are away from each other an angular distance of 180°, and the rotational radius thereof is less than the radius of the planetary gear. In addition, the over pins 81, 82 mesh with internal circular teeth 75 of internal gear disk 74 on the output shaft 72 so that the output shaft 72. can be driven by the planetary gear set 60 as shown in FIGS. 5 and 6.

Figure 1:
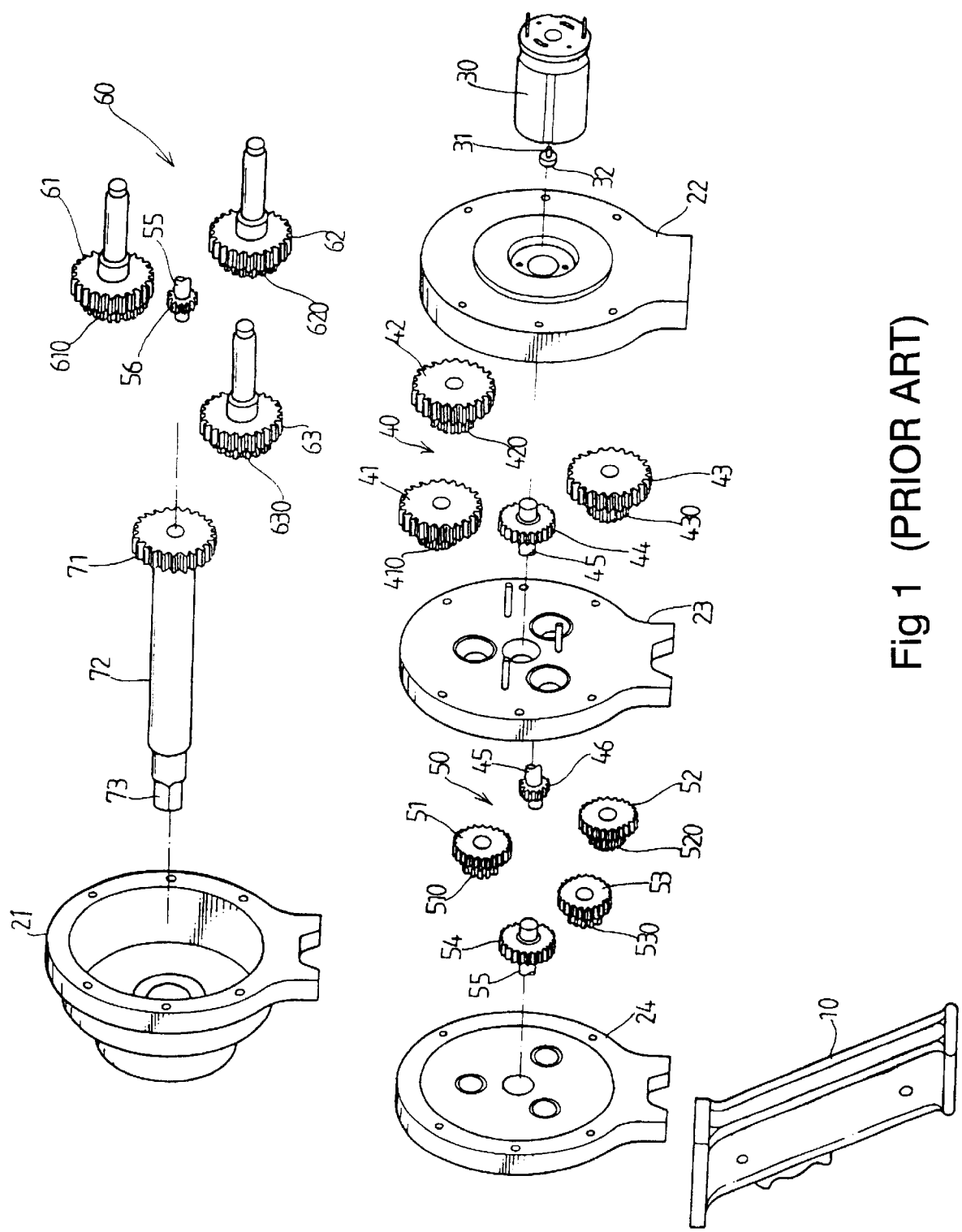
FIG. 1 is a disassembled perspective view of a speed reducer in a portable electric tool of prior art.
Figure 6:
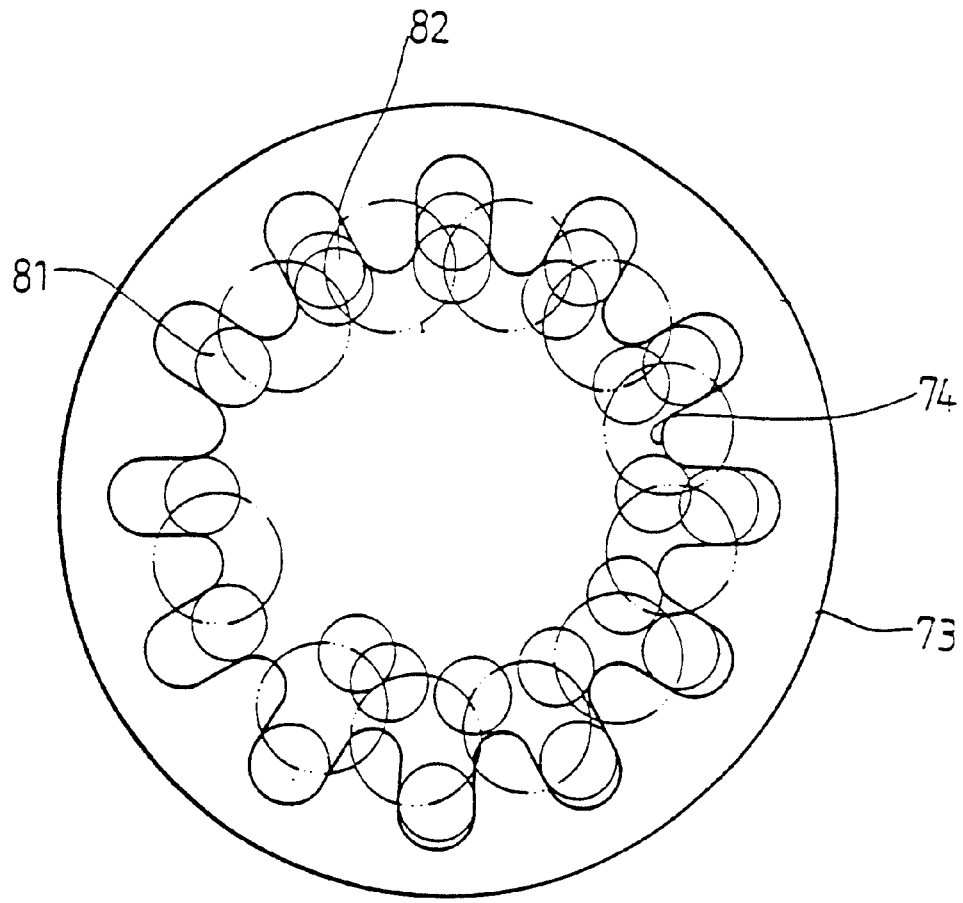
FIG. 6 is a plan view illustrating loci of over pins in the internal gear shown in FIG. 5.

The effectiveness of present invention will be described in detail hereinafter:

1. The torque increases greatly:

Taking an embodied example, the internal gear disk 74 provides twelve internal teeth 75 and planetary gears 61, 62, 63 rotate a revolution respectively as shown in FIG. 6. Then, over pins 81, 82 may rotate 360° respectively such that the internal gear disk 74 can be drive to rotate an angular movement of one of twelve internal teeth. Thus, the output shaft 72 can rotate 1/12 revolution to generate a speed reduction of 1/12 and a torque 12 times of the original one. Accordingly, the torque generated by the present invention is at least twice as the prior art shown in FIG. 1.

2. The life span is longer:

Because the respective over pin 81, 82 has a smaller rotational radius than the radius of respective planetary gear 61, 62, 63, the integral strength of over pins 81, 82 is better than the external gear meshing as the prior art does. Hence, the resistant force generated by the output shaft 72 can be buffered by the over pins 81, 82. In addition, the structure of over pins 81, 82 being disposed between two internal teeth 75 can reduce the change of planetary gears 61, 62, 63 loosening outward and occurring fracture so as to provide an enhanced life span.

3. An adapter shaft 210 is fastened to the front casing 21 externally and a longer auxiliary handle 11 fits with a free end of the adapter shaft 210. Thus, the user can operate the primary handle 10 and the auxiliary handle 11 while the portable electric tool is in use. Because the auxiliary handle 11 is longer, it is possible to be pressed against the floor during subjecting the force. Therefore, the wrist can be protected and an advantage of effect saving can be reached.

4. A motor of direct current without carbon brush can be adopted as the motor 30 utilized in the present invention such that it is unable to generate heat easily even if the motor runs a long period of time continuously.

While the invention has been described with referencing to a preferred embodiment thereof, it is to be understood that modifications or variations may be easily made without departing from the spirit of this invention, which is defined by the appended claims.

What is claimed is:

1. A speed reducer in a portable electric tool, comprising:

a gear box, a motor, and an end planetary gear set driven by the motor, and a output shaft with two ends;

characterized in that the output shaft provides an end thereof with an internal gear disk, the internal gear disk further provides a plurality of internal circular teeth; the end planetary gear set provides a plurality of planetary gears and each planetary gear extends outward two oppositely parallel positioned over pins from a lateral end face thereof with respect to an axial center thereof; the over pins provide a rotational radius smaller than a radius of each planetary gear respectively and each one of the over pins is disposed at two of the internal circular teeth;

whereby, as soon as the motor is started to run, the output shaft can rotate by way of being driven by the planetary gear set.

2. The speed reducer in a portable electric tool as defined in claim 1, wherein the internal gear disk provides the internal circular teeth surrounding therein.

3. The speed reducer in a portable electric tool as defined in claim 1, where n the over pins are disposed away an angular distance of 180°.

4. The speed reducer in a portable electric tool as defined in claim 1, wherein a primary handle is provided at a bottom of the gear box and a adapter shaft with a free end is mounted to and passes through a front casing on the gear box for the free end meshing with an auxiliary handle longer than the primary handle.

5. The speed reducer in a portable electric tool as defined in claim 1, wherein the motor is direct current without carbon brushes.

* * * * *